United States Patent [19]
Smith et al.

[11] 4,453,778
[45] Jun. 12, 1984

[54] PROPORTIONING HYDRAULIC BRAKE MECHANISM

[75] Inventors: Terrence Smith, Dearborn; Thomas S. Moore, Northville; Earl L. Helmers, Westland, all of Mich.

[73] Assignee: Ford Motor Company, Dearborn, Mich.

[21] Appl. No.: 111,065

[22] Filed: Jan. 10, 1980

[51] Int. Cl.³ .................... B60T 8/18; B60T 8/26
[52] U.S. Cl. .................... 303/22 R; 180/282; 188/195; 303/6 C; 303/100
[58] Field of Search .......... 303/22 R, 3, 100, 13-17, 303/93, 116, 23 R, 23 A, 24; 188/195, 349; 180/282, 290

[56] References Cited
U.S. PATENT DOCUMENTS

| 3,257,153 | 6/1966 | Strifler | 303/22 R |
|---|---|---|---|
| 3,423,936 | 1/1969 | Stelzer | 303/6 C |
| 3,614,175 | 10/1971 | Lawson | 303/22 R |
| 3,938,850 | 2/1976 | Pembleton et al. | 188/349 X |
| 3,950,037 | 4/1976 | Pembleton et al. | 188/195 X |
| 4,049,323 | 9/1977 | Hess | 303/22 R X |
| 4,050,743 | 9/1977 | Knight | 303/22 R |
| 4,058,346 | 11/1977 | Burckhardt | 303/100 X |
| 4,062,597 | 12/1977 | Sawyer et al. | 303/6 C |
| 4,073,541 | 2/1978 | Nagase | 303/3 |

FOREIGN PATENT DOCUMENTS

| 1161952 | 10/1967 | United Kingdom . |
|---|---|---|
| 1220460 | 1/1971 | United Kingdom . |
| 1243743 | 8/1971 | United Kingdom . |
| 1322871 | 7/1973 | United Kingdom . |
| 1355581 | 6/1974 | United Kingdom . |
| 2016103 | 9/1979 | United Kingdom ............. 303/22 R |

Primary Examiner—Douglas C. Butler
Attorney, Agent, or Firm—Peter D. McDermott; Roger L. May

[57] ABSTRACT

A hydraulic brake control device has a load sensing component connected through an electric circuit to a motorized proportioning valve which loads or unloads a resilient member therein to vary the split point of the proportioning valve. The electric circuit has an attitude cutoff switch and a speed cutoff switch which deactivate the electric circuit when the vehicle is pitched or rolled above a predetermined horizontal attitude and moving faster than a predetermined speed, respectively. The electric circuit can either actuate the motor to load the resilient member within proportioning valve, unload the resilient member within proportioning valve, or render the motor inactive and maintain the proportioning valve in a status quo condition.

17 Claims, 8 Drawing Figures

PROPORTIONING HYDRAULIC BRAKE MECHANISM

BACKGROUND OF THE INVENTION

1. Field of the Invention

This invention relates to an adjustable proportioning valve for vehicle hydraulic brake systems and more particularly to an automatically adjustable motorized proportioning valve for such brake systems.

2. Description of the Prior Art

It is known in the art to provide a pressure proportioning valve in a vehicle brake system that includes a master cylinder and front and rear wheel brakes. A typical proportioning valve limits the pressurization of the rear brakes relative to the front brakes in response to a master cylinder pressure that exceeds a predetermined minimum. During initial buildup of master cylinder pressure, the front and rear brakes are substantially equal. When the master cylinder pressure exceeds a predetermined minimum, the proportioning valve becomes effective to limit further increases in the pressure at the rear brakes whereby the front-to-rear pressures are at a ratio of less than one-to-one. U.S. Pat. No. 3,423,936 discloses such a proportioning valve.

A pressure proportioning valve interposed in a brake system functions to compensate for differences in the effectiveness of the front and rear brakes. The differences in effectiveness may be due, in part, to differences in the types of brakes employed (for an example, disc brakes on the front wheels and self-energizing drum brakes on the rear wheels) and also, for the dynamic weight shift to the front axle during a brake application. It is the weight shift which produces the principal need for a proportioning valve.

The imbalance between the effectiveness of the front and rear brakes is particularly apparent in a truck and varies substantially depending upon the amount of load which the truck carries. In a fully loaded truck, the weight on the rear axle may be such that the rear brakes having a braking capability that is almost as great as that of the front wheels. When the same truck is in an unladen condition, however, its rear brakes will not be nearly as effective as the front brakes. In such an unladen truck, equal pressure at the front and rear brakes would produce rear wheel skid when the master cylinder pressure is high enough to produce a moderate rate of vehicle deceleration.

The proportioning valve for a passenger automobile brake system is provided with a fixed split point, that is, a fixed point in the buildup of master cylinder pressure at which the proportioning valve becomes effective to limit or retard further increases in pressure at the rear brakes. Because the amount of load carried by a passenger automobile is not substantial in relationship to the total weight of the vehicle, the relative effectiveness of the front and rear brakes is not changed substantially by vehicle load changes. Therefore, a proportioning valve having a fixed split point is acceptable in passenger cars.

In a truck, however, where the relative effectiveness of the front and rear brakes changes greatly depending upon the load of the vehicle, it is desirable to have a proportioning valve with a split point that may be modulated in response to the load on the vehicle. U.S. Pat. No. 4,062,597 issued to Sawyer et al on Dec. 13, 1977 and U.S. Pat. No. 3,614,175 issued to Lawson on Oct. 19, 1971 disclose proportioning valves that are directly connected to a spring mechanism which varies the minimum master cylinder pressure point where the valve becomes effective to modulate rear brake line pressure (i.e. split point) depending upon the loads placed upon the spring mechanism.

U.S. Pat. No. 3,257,153 issued to Strifler on June 21, 1966 also discloses a load sensitive proportioning valve which has a certain geometry to minimize the effect of dynamic horizontal forces on the proportioning valve while the vehicle is in motion.

Expensive anti-skid control circuits have also been developed to prevent wheels from skidding. One such anti-skid control device is disclosed in U.S. Pat. No. 4,050,743 issued to Knight on Sept. 27, 1977 is for a pneumatic brake system.

Another pneumatic brake system which uses electric braking blended with direct pneumatic braking is disclosed in U.S. Pat. No. 4,073,541 issued to Nagase on Feb. 14, 1978.

SUMMARY OF THE DISCLOSURE

According to the invention, a hydraulic brake control mechanism for a motor vehicle hydraulic brake system has a load sensing device and a proportioning valve. The valve has an inlet connectable to a hydraulic brake line leading from a brake master cylinder and an outlet connected to a set of rear brakes for the motor vehicle. The proportioning valve has an adjuster for adjusting the minimum pressure or split point at which modulation by the valve of rear brake line pressure occurs. An electric circuit operably connects the load sensing device to the adjuster whereby valve adjustment is dependent upon the weight sensed by the load sensing device.

In one embodiment, the electric circuit includes an attitude cutoff switch such that the circuit is activated only when the cutoff switch senses the vehicle is near a horizontal attitude within a predetermined number of degrees. In one preferred embodiment, the electric circuit also includes a speed sensing cutoff switch such that the circuit is activated only when the speed sensing cutoff switch senses the vehicle is stationary or moving below a predetermined speed.

The electric circuit includes a sensor to provide a feedback signal proportional to adjuster position whereby adjustment of the split point of the valve is dependent, in part, upon the existing adjusted position of the valve.

In the illustrated embodiment, the adjuster includes an electric motor operably connected to the proportioning valve such that the actuation of the electric motor loads or unloads the resilient biasing member that determines the minimum pressure at which modulation by the valve if brake line pressure occurs.

BRIEF DESCRIPTION OF THE DRAWINGS

Reference now will be made to the following drawings, in which.

DETAILED DESCRIPTION OF THE PREFERRED EMBODIMENT

Figure 1:
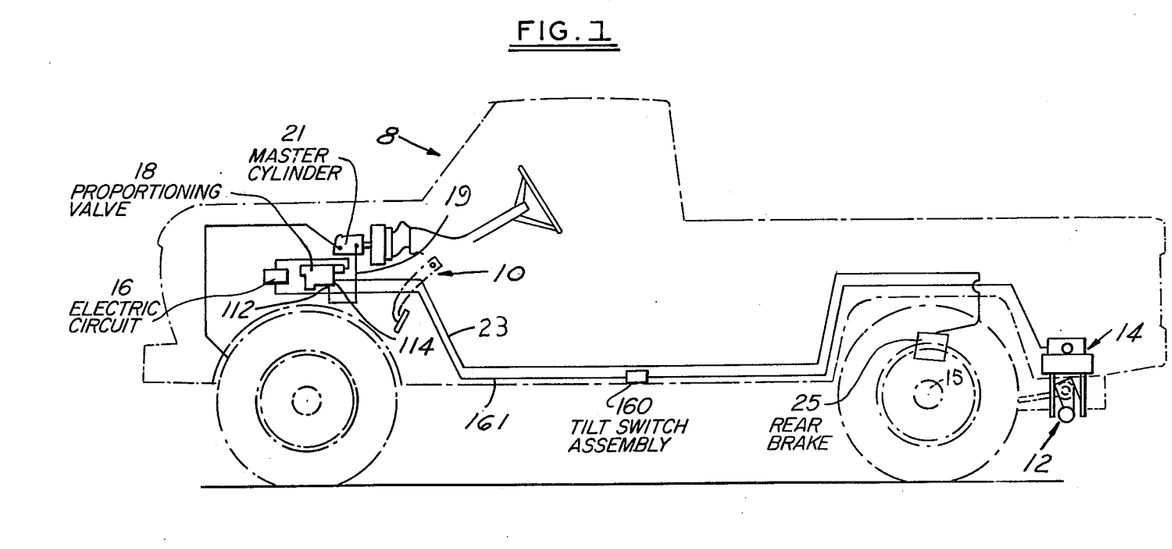
FIG. 1 is a side elevational and schematic view of a motor vehicle incorporating an embodiment of the invention.

Referring to FIG. 1, a motor vehicle 8 has a hydraulic brake control mechanism 10 which, in general, includes a hydraulic pressure source, a rear brake connected to the source and a means interposed in the connection between the source and the rear brake to modulate the hydraulic pressure at the rear brake in response to vehicle load and brake line pressure. The modulating means includes a load sensor 12 mounted near a rear axle 15 and having an electrical capacitor assembly 14 which is electrically connected by a logically controlled electric circuit 16 to a motorized proportioning valve 18. The valve 18 is operably connected on a hydraulic line 19 leading to a brake master cylinder 21 and hydraulic line 23 leading to a set of rear brakes 25.

Figures 2, 3, 7:
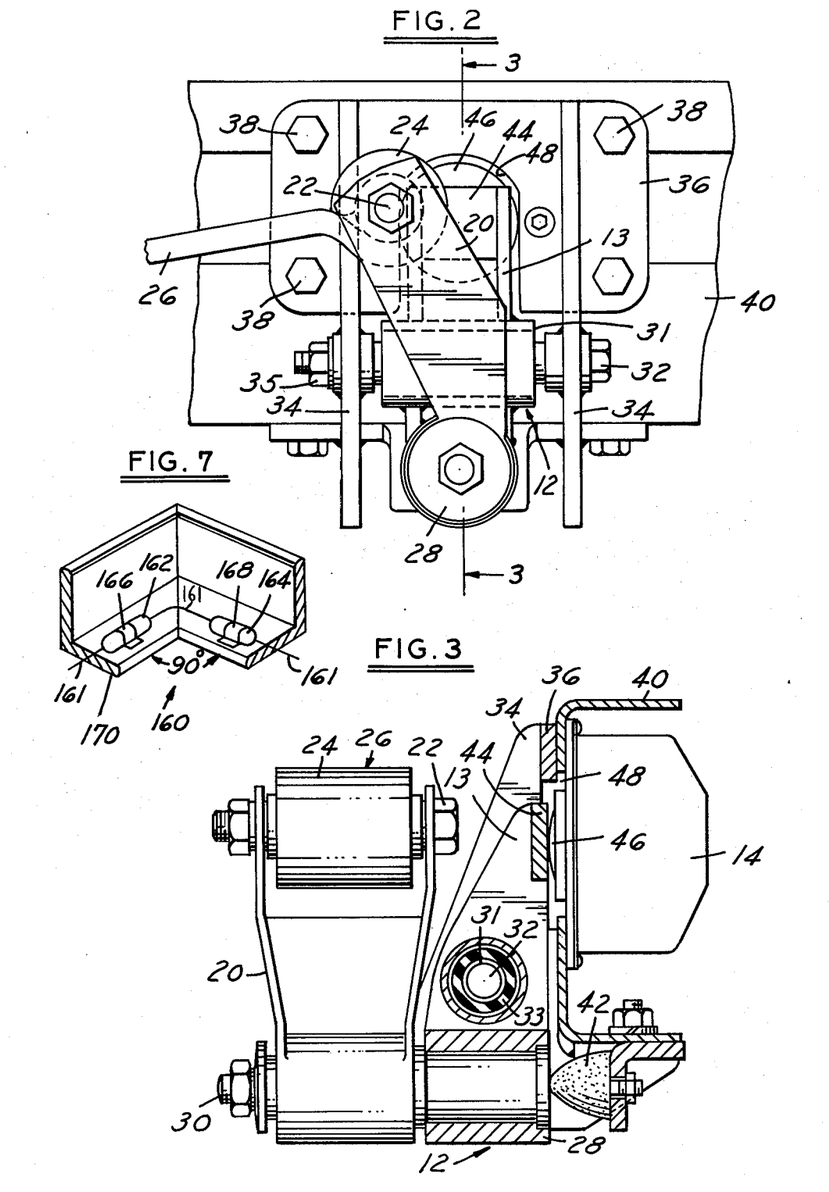
FIG. 2, is a front elevational view of the load sensor shown in FIG. 1.
FIG. 3, is a side elevational and partial cross-sectional view taken along the line 3—3. shown in FIG. 2.
FIG. 7, is a perspective view of the attitude cutoff switch schematically shown in FIG. 6.

In more detail, the load sensor 12 as shown in FIGS. 2 and 3, has a leaf spring shackle 20 attached by a bolt 22 to an eye 24 at the end of leaf spring 26. The shackle 20 has a bottom end 28 pivotably connected to a bolt 30 passing therethrough. The bolt 30 is rigidly fixed to a bottom of an armature 13. The armature 13 has an aperture 31 which pivotably receives bolt 32. A rubber bushing 33 is fitted about the bolt 32 within the aperture 31. The bolt 32 is rigidly mounted onto bracket arms 34 by nut 35. The bracket arms extend from bracket plate 36 which is rigidly bolted by bolts 38 onto motor vehicle frame 40. A rubber rebound pad 42 is attached to the frame to abut the bottom portion 28 of the armature 13. The upper part of the armature 13 has a striker plate section 44 which abuts a button 46 of the capacitor assembly 14 through an aperture 48 in the frame 40.

Figure 4:
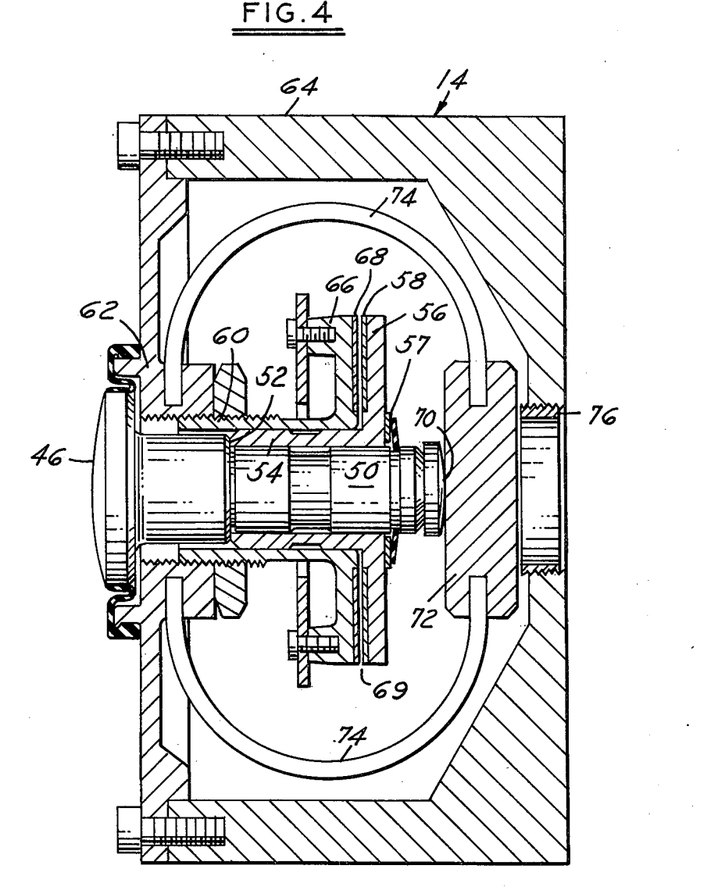
FIG. 4, is a cross-sectional view of a capacitor assembly component of the load sensor shown in FIG. 3.

The capacitor assembly 14 is shown in detail in FIG. 4. The button 44 is connected to a stem 50 which has a shoulder 52 abutting a cylindrical sleeve 54 integral with a plate 56. A snap ring assembly 57 abuts the opposing side of plate 56 to fix the stem 50 with sleeve 54. The plate 56 has a capacitance ring 58 mounted thereon. Surrounding the cylindrical sleeve 54 is a threaded outer sleeve 60 which is threaded onto a cover plate 62 which in turn is bolted onto the housing 64 of assembly 14. The other end of outer sleeve 60 is integral with a plate 66 which has a capacitance ring 68 mounted thereon. Capacitance rings 58 and 68 form a variable capacitor 69.

The stem 50 has an end 70 which abuts a mounting block 72 for mounting two arcuate springs 74 which have their other ends mounted onto cover plate 62. The mounting block 72 is biased by the springs 74 to the left as shown in FIG. 4 against the stem 50. The housing 64 has a threaded set screw 76 mounted therein to abut the mounting block 72 to provide an outer limit of travel for the mounting block 72.

Figure 5:
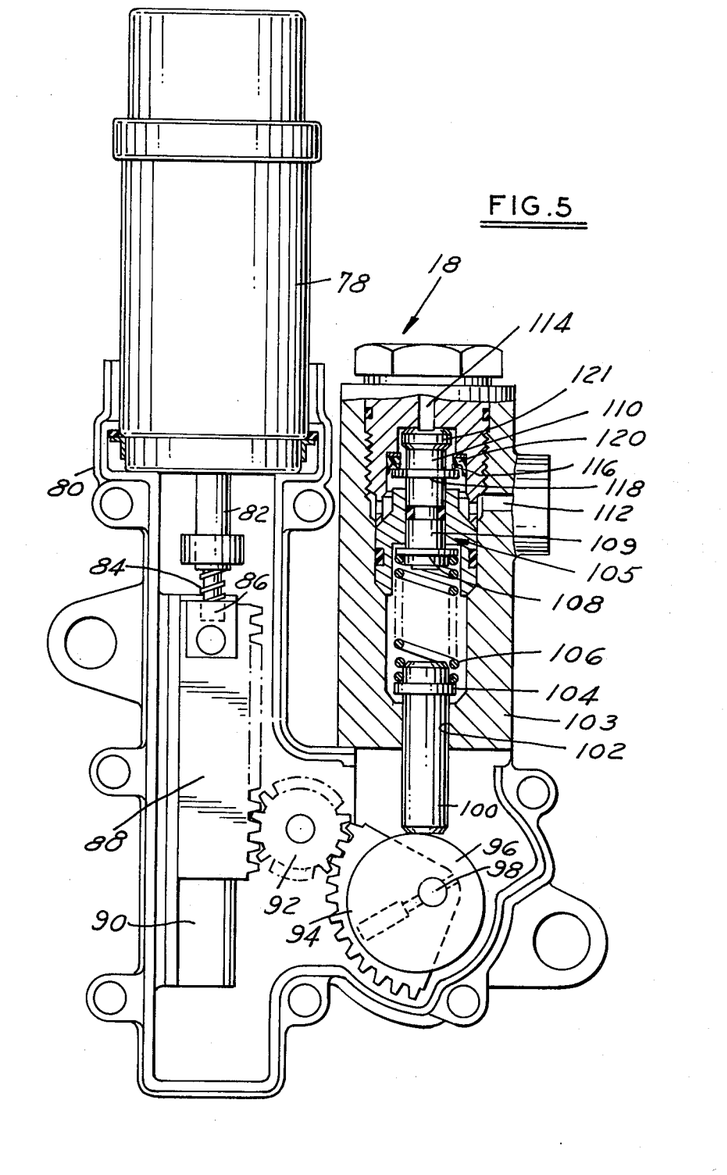
FIG. 5, is a side elevational view, partially in cross-section, of the motorized proportioning valve shown in FIG. 1.

Referring now to FIG. 5, the motorized proportioning valve 18 has an electric motor 78 mounted onto a housing 80. The motor is operably connected to an internally threaded shaft 82. A threaded bolt 84 threadably engages the threaded shaft 82 and has its extending end 86 rigidly secured onto a toothed rack 88 which is slidably mounted on a track 90. Toothed rack 88 engages a pivotably mounted pinion gear 92 which in turn engages a toothed quadrant 94 which is integrally formed with a cam 96 eccentrically and pivotably mounted about a pin 98. The cam abuts a post 100. The post 100 extends through aperture 102 of valve housing 103 and has a spring seat 104 mounted thereon.

A proportioning valve mechanism 105 is housed in housing 103 and is conventional in nature. Reference is made to U.S. Pat. No. 3,423,936 for the operation of the valve mechanism 105. Briefly described, the spring seat 104 seats a spring 106 which has its other end abutting flange 10 fixed on shutoff valve element 110. The proportioning valve 18 has an inlet 112 and an outlet 114. A pressure sensitive flange 118 radially extends outward from stem 110. Above flange 118 is a valve seat 120 which is engageable by flange 118. Grooves 116 in seat 120 allow fluid to flow from inlet 112 to outlet 114. Seat 116 is also engageable by upper end 121 of the valve stem 110 when it is moved downwardly to shutoff the inlet 112 from outlet 114 and modulate the pressure therein. As shown in FIG. 1, the inlet 112 is connected to hydraulic brake line 119 leading from the master cylinder 21. The outlet 114 is connected to hydraulic line 23 leading to the rear brakes.

Figure 6A:
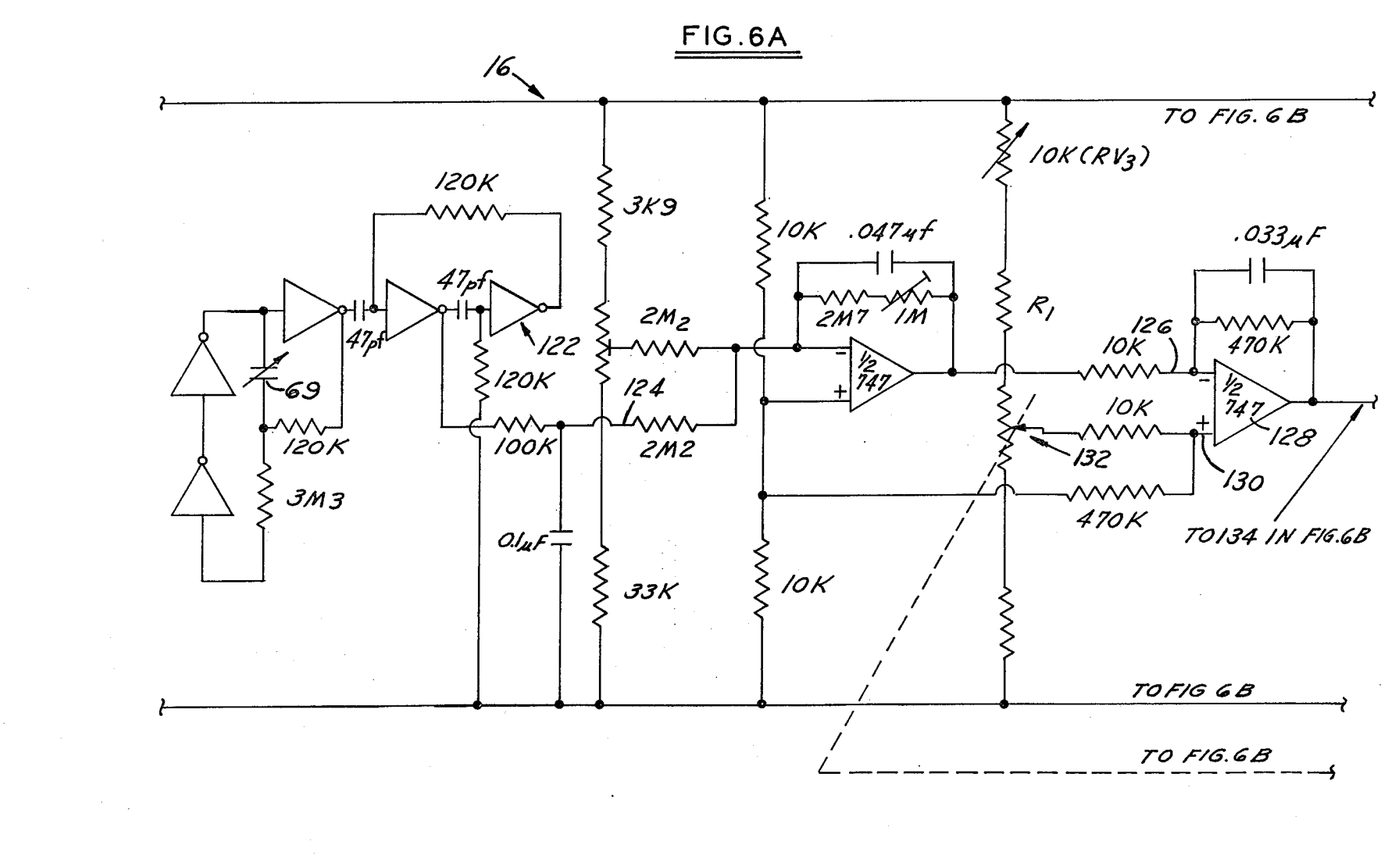
FIGS. 6A and 6B combine to disclose a schematic of the electrical circuit utilized in the embodiment shown in FIG. 1.
Figure 6B:
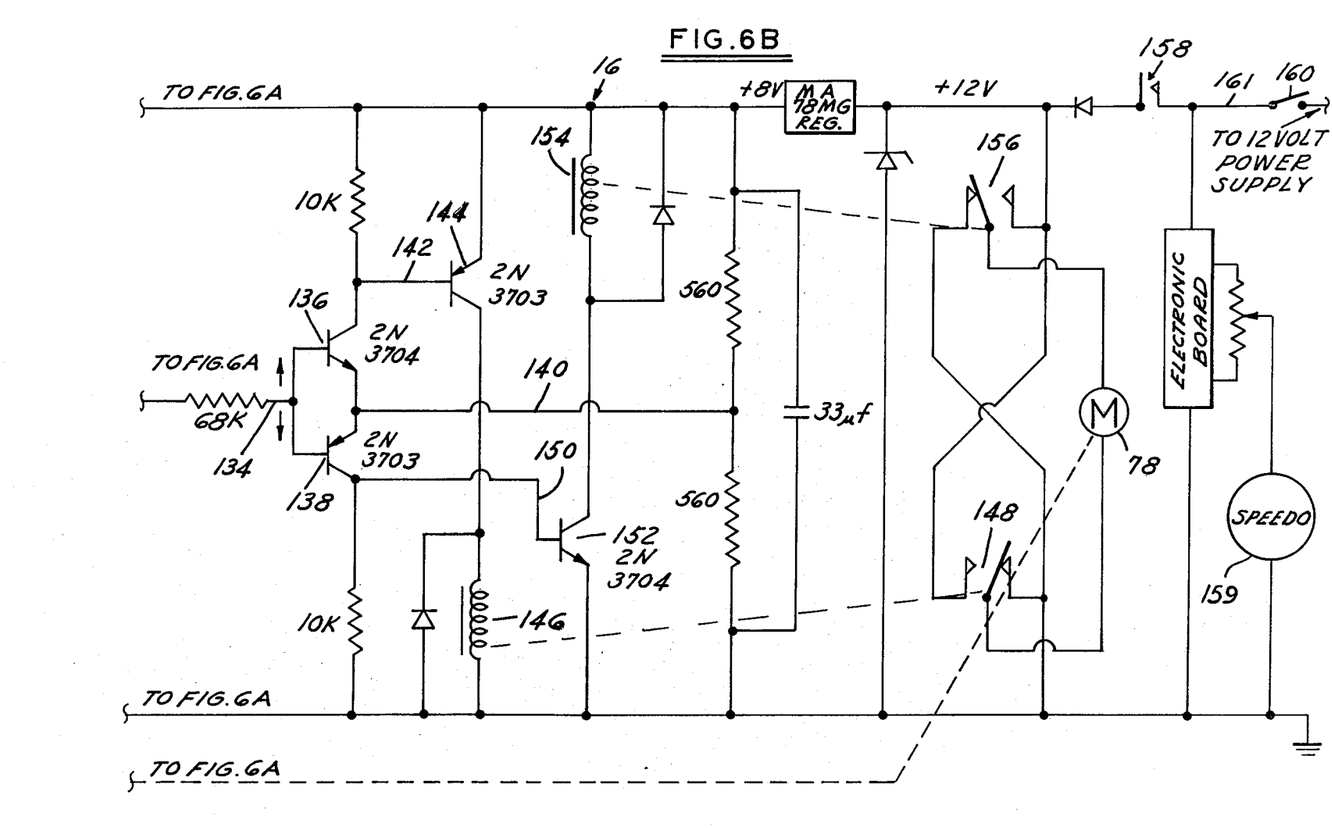

The electric circuit 16 is schematically shown in FIGS. 6A and 6B. A load cell 123 incorporates the variable capacitor 69 to produce a load dependent signal. The load cell 123 is operably connected to an input 126 of a differential operational amplifier 128. A second input 130 of the differential amplifier is connected to a servo-potentiometer 132 which is controlled by motor 78. The differential operational amplifier 128 has its output connected to a transistor circuit section 129 which operably control solenoid operated switches 156 and 148 which in turn respectively actuate the motor 78 in opposite directions.

The electric circuit 16 is operably connected to a relay switching mechanism 158 which senses the speed of the vehicle from speedometer 159 and a tilt switch assembly 160. The tilt switch assembly is shown in more detail in FIG. 7. The tilt switch 160 is mounted onto an sprung portion of the motor vehicle 8. The switch 160 includes two mercury switches 162 and 164 in series mounted by two brackets 166 and 168 onto an angle iron 170 whereby mercury switch 162 senses body roll about the longitudinal axis of the vehicle and mercury switch 164 senses body pitch about a transverse axis.

OPERATION

Referring now to FIGS. 1, 2 and 3, sensor 12 senses the portion of the vehicle load carried by the spring 26 and the rear axle. The downward force of the weight on the frame 40 over the rear axle 15 causes an upward force exerted by leaf spring 26. The upward force exerted by the spring 26 and the shackle 20 exerts a torque while pivoting the shackle armature 13 about in a clockwise direction as shown in FIG. 2 about the pivot pin 32. The striker plate 44 exerts a force directed to the right as shown in FIG. 2 onto the button 46. The force exerted upon button 46 overcomes the spring load exerted by springs 74 to cause the capacitance ring 58 to separate a calibrated distance from capacitance ring 68. When the rear axle supports an increase in vehicle load the distance between capacitance rings 58 and 68 is increased because the spring 76 exerts an increased force which is transmitted through the levers and to the variable capacitance assembly 14 and counterbalanced by springs 74. The capacitor 69, formed from rings 58 and 68 is operably connected to an electric circuit 16 as a variable input.

The load sensor 12 affects the motorized proportioning valve 18 by means of the logically controlled electric circuit 16, the logic being described in detail later. The motor 78 of valve 18 drives the threaded screw 84, depending on the instructions received through circuit 16, either upward or downward into the internal threaded shaft 82 to slide the rack 88 along track 90. As the rack 88 slides along track 90, it causes the pinion gear 92 to rotate either in a clockwise or counterclockwise direction which in turn rotates the quadrant 94 in a clockwise or counterclockwise direction. As shown in FIG. 4, if rotated in a clockwise direction, the cam 96 vertically raises post 100 to compress spring 106. On the other hand, if the quadrant 94 is rotated counterclockwise, the post 100 is lowered to decompress spring 106. The valve mechanism 105 is affected by the change in spring compression in a conventional fashion, namely, the minimum modulating pressure point or split point of the proportioning valve is increased when the spring is compressed and vice versa.

The electrical circuit 16 as shown in FIGS. 6A and B controls the motor to either load or unload the spring or to remain in a neutral inactive position in response to certain input parameters. The electric circuit 16 incorporates a load cell 123 which includes the variable capacitor 69 operably connected to a f-v converter indicated at 122 to produce a voltage output along line 124 depending upon the load on the vehicle sensed by the variable capacitor 69 in the capacitor assembly 14. The output in line 124 produces a depending output to the input lead 126 of a differential operational amplifier 128. The other input 130 is operatively connected to a servo mechanical potentiometer 132 which is operatively attached to the motor 78. The potentiometer 132 can be attached to rack 88, quadrant 94, post 100 or other moveable components which indicate the load exerted on spring 106 and thus, the input along line 130 is dependent upon the load upon spring 106 which is directly controlled by motor 78.

The output 134 is connected to transistor circuit section 129 which includes transistor 136 and transistor 138 connected to the central line 140. The central line 140 has a predetermined fixed voltage, for example 1.4 volts. If, for example, an increase in the load on the vehicle produces a certain depending output along line 124 and the position of servo mechanical potentiometer 132 dependent upon position of the cam 96 controlled by motor 78 causes the differential operational amplifier 128 to produce an output voltage of, for example, 3 volts along line 134, the transistor 136 is actuated to produce a voltage along line 142 which actuates another transistor 144 which actuates solenoid 146 to flip connecting switch 148 to actuate motor 78 which moves cam 96 to compress spring 106. When spring 106 is compressed, the split point is elevated. In other words, the minimum pressure needed in outlet 114 to move stem 110 against the biasing pressure of spring 106 for commencing modulation of the pressure in outlet 114 relative to the pressure in inlet 112 is increased.

As the cam 96 moves to compress spring 106 the servo mechanical potentiometer 132 is moved such that the input voltage on line 130 is changed until the voltage on line 134 drops down to 1.4 volts. Once the voltages on line 134 and central line 140 are balanced, the transistor 136 is deactuated which turns off the solenoid 146 which opens the switch 148 back to its position as shown in FIG. 6. The motor 78 then is deactuated or placed in a neutral or inactive position.

As weight is taken off the vehicle, the capacitor 69 will sense the change which produces a different voltage output along line 124 which causes the differential operational amplifier 128 to drop the voltage on line 134 to a value below 1.4 volts, for example 1 volt. The drop in voltage on line 134 then turns on the transistor 138 which in turn produces a voltage along line 150 which turns on another transistor 152 which actuates solenoid 154 which flips connecting switch 156. When the switch 156 is flipped the motor then reverses to turn cam 96 to unload or decompress spring 106. When the spring 106 is decompressed, the split point is lowered. As the motor then unloads the spring 106, the servo potentiometer 132 moves until an equilibrium exists between line 134 and central line 140. At this point the transistor 138 is shutoff and deactuates transistor 154 which in turn deactuates solenoid 154 which flips relay switch 156 back to the position as shown in FIG. 5 to shutoff the motor 78.

In addition, the electric circuit includes an electronic relay switching mechanism 158 which senses the speed of the vehicle and opens the relay switch 158 when the vehicle is moving above a certain predetermined speed as indicated in speedometer 159. When relay switch 158 is open, the power to the motor and electric circuit is cutoff and the motor 78 remains inactive.

Further, the tilt switch 160 opens if the vehicle is above a predetermined angle of attitude which can occur if the vehicle is parked on the side of a hill or other incline. The mercury switches 126 and 164 are in series along line 161 such that if either the pitch angle or the roll angle of the vehicle is over a predetermined amount, the tilt switch 160 is open and the electric circuit is deactuated to render the motor in a neutral mode.

In this fashion, a motorized proportioning valve is automatically adjusted to modulate the line pressure at varying pressure points or split points in a hydraulic brake line leading to the rear brakes of a motor vehicle. By using an electric circuit connecting the load sensor to the proportioning valve, certain controls can be incorporated to further control the modulation of the rear line pressure. Two such controls are the speed cutoff switch and tilt cutoff switch. The speedometer cutoff switch 158 and the tilt switch 160 permit a discrete adjustment of the motorized proportioning valve only under conditions in which the vehicle is substantially horizontal and still. The discrete nature of the valve adjustment prevents the motor from excessively working and allows the motor to operate at the most usual times when changes in weight occur on the vehicle; namely, when the vehicle is still and horizontal during loading or unloading thereof.

In this fashion, a hydraulic brake control adjuster can economically be manufactured to maximize braking efficiency of a motor vehicle by tuning it to a sensed weight thereon.

Variations and modifications of the present invention can be made without departing from the spirit and scope of the invention as defined by the appended claims.

The embodiments in which an exclusive privilege or property is claimed are defined as follows:

1. A hydraulic brake control mechanism for a motor vehicle, said mechanism comprising:

a load sensing device mountable to said motor vehicle;

a proportioning valve mountable to said motor vehicle;

said valve having an inlet connectable to a hydraulic brake line and an outlet connectable to a hydraulic line that is operably connected to a set of rear brakes for said motor vehicle;

means for adjusting said valve such that the minimum pressure needed to close said valve is variable;

an electrical circuit operably connected to said load sensing device and to said adjusting means such that said adjusting means is electrically actuated to adjust said valve with said valve adjustment being dependent upon weight sensed by said load sensing device; and said electric circuit includes a speed sensing cutoff switch means for deactivating said circuit when said vehicle is moving faster than a predetermined speed such that said circuit is activated to actuate said adjusting means only when said vehicle is still or moving below a predetermined speed.

2. A hydraulic brake control mechanism as defined in claim 1 wherein;

said adjusting means comprises an electric motor operably connected to said proportioning valve such that actuation of the electric motor loads or unloads a resilient biasing member which the pressure in the hydraulic brake line must overcome to move the proportioning valve to its closed position.

3. A hydraulic brake control mechanism as defined in claims 1 or 2 wherein;

said load sensing device senses weight exerted upon a rear axle of said motor vehicle.

4. A hydraulic brake control mechanism for a motor vehicle, said mechanism comprising;

a load sensing device mountable to said motor vehicle;

a proportioning valve mountable to said motor vehicle;

said valve having an inlet connectable to a hydraulic brake line and an outlet connectable to a hydraulic line that is operably connected to a set of rear brakes for said motor vehicle;

means for adjusting said valve such that the minimum pressure needed to close said valve is variable; and an electrical circuit operably connected to said load sensing device and to said adjusting means such that said adjusting means is electrically actuated to adjust said valve with said valve adjustment being dependent upon weight sensed by said load sensing device;

said electric circuit includes an attitute cutoff switch means for deactivating said circuit when said vehicle has a pitch or roll angle greater than a predetermined amount such that said circuit is activated to actuate said adjusting means only when said vehicle is near horizontal within a predetermined number of degrees.

5. A hydraulic brake control mechanism as defined in claim 4 wherein;

said electric circuit includes a speed sensing cutoff switch means for deactivating said circuit when said vehicle is moving faster than a predetermined speed such that said circuit is activated to actuate said adjusting means only when said vehicle is still or moving below a predetermined speed.

6. A hydraulic brake control mechanism as defined in claim 5 wherein;

said load sensing device senses weight exerted upon a rear axle of said motor vehicle.

7. A hydraulic brake control mechanism for a motor vehicle, said mechanism comprising;

a load sensing device mountable to said motor vehicle;

a proportioning valve mountable to said motor vehicle;

said valve having an inlet connectable to a hydraulic brake line and an outlet connectable to a hydraulic line that is operably connected to a set of rear brakes for said motor vehicle;

means for adjusting said valve such that the minimum pressure needed to close said valve is variable; and an electrical circuit operably connected to said load sensing device and to said adjusting means such that said adjusting means is electrically actuated to adjust said valve with said valve adjustment being dependent upon weight sensed by said load sensing device;

said adjusting means comprises an electric motor operably connected to said proportioning valve such that actuation of the electric motor loads or unloads a resilient biasing member which the pressure in the hydraulic brake line must overcome to move the proportioning valve to its closed position;

said electric circuit includes an attitude cutoff switch means for deactivating said circuit when said vehicle has a pitch or roll angle greater than a predetermined amount such that said circuit is activated to actuate said electric motor only when said vehicle is near horizontal within a predetermined number of degrees.

8. A hydraulic brake control mechanism as defined in claim 7 wherein;

said electric circuit includes a speed sensing cutoff switch means for deactivating said circuit when said vehicle is moving faster than a predetermined speed such that said circuit is activated to actuate said electric motor only when said vehicle is still or moving below a predetermined speed.

9. A hydraulic brake control mechanism as defined in claim 8 wherein;

said load sensing device senses weight exerted upon a rear axle of said motor vehicle.

10. A hydraulic brake control mechanism for a motor vehicle, said mechanism comprising:

a load sensing device mountable to said motor vehicle;

a proportioning valve mountable to said motor vehicle;

said valve having an inlet connectable to a hydraulic brake line and an outlet connectable to a hydraulic line that is operably connected to a set of rear brakes for said motor vehicle;

means for adjusting said valve operably connected to said load sensing device such that the minimum pressure needed to close said valve is variable and dependent upon weight sensed by said load sensing device;

deactuating means for deactuating said adjusting means under certain predetermined conditions such that said adjusting means adjusts said valve dependent upon said weight of said vehicle only when certain predetermined parameters are fulfilled;

an electric circuit operably connected to said load sensing device and to said adjusting means such that said adjusting means is electrically actuated to adjust said valve with said valve adjustment being dependent upon weight sensed by said load sensing device;

said deactuating means constructed to deactuate said electric circuit when said predetermined conditions exist thereby deactuating said adjusting means;

one of said predetermined cnditions being when said vehicle has a roll or pitch attitude above a predetermined number of degrees; and one of said predetermined parameters being when said vehicle is substantially horizontal within a predetermined number of degrees.

11. A hydraulic brake control mechanism for a motor vehicle said mechanism comprising:

a load sensing device mountable to said motor vehicle;

a proportioning valve mountable to said motor vehicle;

said valve having an inlet connectable to a hydraulic brake line and an outlet connectable to a hydraulic line that is operably connected to a set of rear brakes for said motor vehicle;

means for adjusting said valve operably connected to said load sensing device such that the minimum pressure needed to close said valve is variable and dependent upon weight sensed by said load sensing device;

deactuating means for deactuating said adjusting means under certain predetermined conditions such that said adjusting means adjusts said valve dependent upon said weight of said vehicle only when certain predetermined parameters are fulfilled;

an electric circuit operably connected to said load sensing device and to said adjusting means such that said adjusting means is electrically actuated to adjust said valve with said valve adjustment being dependent upon weight sensed by said load sensing device;

said deactuating means constructed to deactuate said electric circuit when said predetermined conditions exist thereby deactuating said adjusting means;

one of said predetermined conditions being when said vehicle is moving faster than predetermined speed;

one of said parameters being when said vehicle is still or moving below a predetermined speed;

one of said predetermined conditions being when said vehicle has a roll or pitch attitude above a predetermined number of degrees; and one of said predetermined parameters being when said vehicle is substantially horizontal within a predetermined number of degrees.

12. A hydraulic variable valve control mechanism comprising:

a load sensing device;

a proportioning valve with an inlet and outlet;

means for adjusting said valve such that the minimum pressure in the outlet needed to close said valve is variable; and an electric circuit operably connected to said load sensing device and to said adjusting means such that said adjusting means is electrically actuated to adjust said valve with said valve adjustment being dependent upon a load sensed by said load sensing device;

deactuating means for deactuating said adjusting means under certain predetermined conditions such that adjustment of said valve depending upon the load sensed by said load sensing device occurs only when certain predetermined parameters are fulfilled.

13. A hydraulic variable valve control mechanism as defined in claim 12 wherein:

said adjusting means comprises an electric motor operably connected to said proportioning valve such that actuation of the electric motor loads or unloads a resilient biasing member which pressure in said outlet must overcome to move the proportioning valve to its closed position.

14. A hydraulic variable valve control mechanism as defined in claim 12 wherein:

said deactuating means comprises an attitude cutoff switch means in said electric circuit for deactivation of said circuit when switch has an attitude from the horizontal greater than a predetermined amount.

15. A hydraulic variable valve control mechanism as defined in claim 12 further comprising:

said deactuating means being operably attached to a speedometer; and said deactuating means constructed to deactuate said electric circuit when said speedometer is set above a certain predetermined amount.

16. A hydraulic brake control mechanism for a motor vehicle; said mechanism comprising:

a load sensing device mountable to said motor vehicle;

a proportioning valve mountable to said motor vehicle;

said valve having an inlet connectable to a hydraulic brake line and an outlet connectable to a hydraulic line that is operably connected to a set of rear brakes for said motor vehicle;

means for adjusting said valve operably connected to said load sensing device such that the minimum pressure needed to close said valve is variable and dependent upon weight sensed by said load sensing device;

deactuating means for deactuating said adjusting means under certain predetermined conditions such that adjustment of said valve dependent upon said weight of said vehicle occurs only when certain predetermined parameters are fulfilled;

an electric circuit being operably connected to said load sensing device and to said adjusting means such that said adjusting means is electrically actuated to adjust said valve with said valve adjustment being dependent upon weight sensed by said load sensing device;

said deactuating means deactuating said electric circuit when said predetermined conditions exist thereby deactuating said adjusting means.

17. A hydraulic brake control as defined in claim 16 wherein;

one of said predetermined conditions being when said vehicle is moving faster than predetermined speed; and one of said parameters being when said vehicle is still or moving below a predetermined speed.

* * * * *